United States Patent [19]

Saxon

[11] 3,859,462

[45] Jan. 7, 1975

[54] ARRANGEMENT TO CONTROL A FUNCTION AT A REMOTE LOCATION

[75] Inventor: B. Ronald Saxon, Harrisburg, Pa.

[73] Assignee: International Telephone and Telegraph Corporation, Nutley, N.J.

[22] Filed: Aug. 15, 1973

[21] Appl. No.: 388,674

[52] U.S. Cl. .............................. 179/2 A, 340/167 B
[51] Int. Cl. .......................................... H04m 11/00
[58] Field of Search ........... 179/2 A, 15 BF, 15 BY, 179/84 SS, 175.21, 84 VF, 41 A; 333/70 R; 340/164 A, 167 A, 167 B, 170, 171 R, 172, 311; 325/321; 329/106; 328/72, 77, 129

[56] References Cited

UNITED STATES PATENTS

| | | | |
|---|---|---|---|
| 3,061,783 | 10/1962 | Noller | 179/84 VF |
| 3,478,317 | 11/1969 | Hales | 340/171 R |
| 3,557,312 | 1/1971 | Vogelman et al. | 179/41 A |
| 3,705,386 | 12/1972 | Gueldenpfenning et al. | 340/167 B |
| 3,783,193 | 1/1974 | Lee | 179/2 A |

*Primary Examiner*—William C. Cooper
*Assistant Examiner*—Tommy P. Chin
*Attorney, Agent, or Firm*—John T. O'Halloran; Menotti J. Lombardi, Jr.; Alfred C. Hill

[57] ABSTRACT

There is disclosed herein an arrangement to enable control of a function at a remote location from a local location employing a single frequency tone which provides voice immunity by subjecting the tone to a time duration gate circuit where signals having the same frequency as the tone but having a time duration less than a predetermined time duration are rejected while signals having the same frequency as the tone exceeding the predetermined time duration are passed to control the function at the remote location. The rejected signals are used to reset the time gate circuit to its quiescent state so that closely spaced signals having the frequency of the tone but of insufficient duration will not cause false operation or control of the function at the remote location.

8 Claims, 2 Drawing Figures

PATENTED JAN 7 1975

3,859,462

SHEET 1 OF 2

ARRANGEMENT TO CONTROL A FUNCTION AT A REMOTE LOCATION

BACKGROUND OF THE INVENTION

This invention relates to remote control arrangements and more particularly to an arrangement to control a function at a remote location from a local location.

Devices are presently being employed to control a function at a remote location from a local location employing as the most convenient means of communication between the control location and the function location a transmission line, such as dedicated leased telephone channel or line. Thus, the equipment employed acts as an interface between control and function and the leased telephone line. Audio band tone operation is generally employed because of the nature of carrier and microwave long distance telephone channels. This is usually accomplished by employing audio frequency tone oscillators at one end of the system and narrow band tone filters at the opposite end of the system that are tuned to the same frequency as the oscillators. Also employed are switches gating the tone signals on and off of the leased telephone channel. The oscillators and filters are generally isolated and impedance matched via transformers. In systems where voice signals are present (remote paging and communication), there is the added requirement that the receiving tone filters be immune to the voice signals so as not to cause false operation or control of the remote function.

The shortcoming of these arrangements is the lack of voice signal immunity if single frequency control is employed. There is also the added system cost if two or more simultaneous tones are employed to achieve immunity against false operation. In addition, some multitone systems may require that two or more tones delivered to the receiver (tone filters) be within given amplitude tolerances. If such tones are relatively far apart in the frequency band, the telephone facilities with unconditioned frequency response may impose operational limits on the system. These operational limits may be alleviated by obtaining conditioned lines, but at greater expense. Also present in the consideration that if either the tone oscillators or filters have a tendancy to drift off frequency, whether due to temperature, aging, etc., multi-tone operation will compound the operational difficulties caused by such frequency drift.

SUMMARY OF THE INVENTION

An object of the present invention is to provide an arrangement to control a function at a remote location from a local location overcoming the aforementioned difficulties with multi-tone operation (cost, line response, frequency drift, etc.).

Another object of the present invention is to provide an arrangement to control a function at a remote location from local location employing single frequency operation having voice immunity.

A feature of the present invention is the provision of an arrangement to control a function at a remote location comprising: a telephone line interconnecting a local location and the remote location; a source of audio control signal disposed at the local location, the audio control signal time having a given frequency; first means coupled to the telephone line at the local location to inject the audio control signal into the operating frequency band of the telephone line for a given length of time to provide the audio control signal with a first given time duration; second means coupled to the telephone line at the remote location to detect the audio control signal; and third means coupled to the second means at the remote location responding to the audio control signal only if the audio control signal exceeds a second given time duration less than the first given time duration by a given amount to control the function at the remote location and to reject all other audio signals having the given frequency and a time duration less than the second time duration regardless of how close the audio signals having the time duration less than the second time duration are spaced.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

The following description will be directed toward a remote paging arrangement under control of a single frequency tone. However, it is particularly pointed out that the arrangement of the present invention is not limited to remote paging but may be employed to control other functions at a remote location from a local location. In addition, specific values of certain parameters are employed in the following description, but these values are only examples of the values the parameters may have and are employed herein only for ease of description. The values of the parameters may be changed to be compatible with other similar systems without departing from the principles of the present invention.

Figure 1:
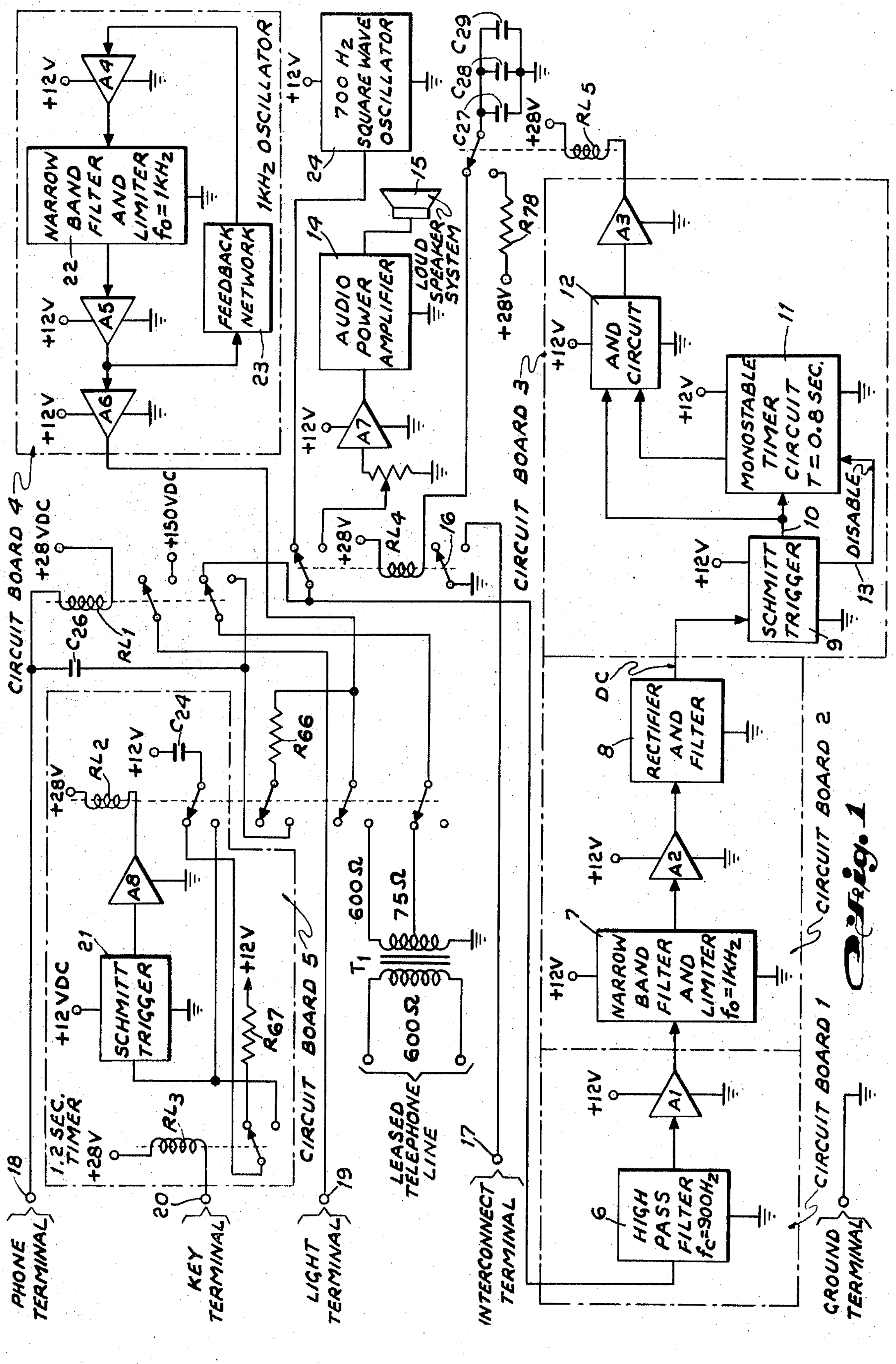
FIG. 1 is a block diagram of the arrangement to control a function at a remote location from a local location in accordance with the principles of the present invention.

Referring to FIG. 1, there is illustrated therein in block diagram form the arrangement of the present invention to control a function at a remote location from a local location with the components of FIG. 1 being those present at one subscriber location at one end of a leased telephone line, for instance, the remote location, with these components being duplicated at the other end of the same leased telephone line, for instance, the local location, associated with another subscriber location.

The operation begins with the application of an audio frequency tone, such as a 1 KHz (kilohertz) tone, to the leased telephone line terminals of transformer T1 at the local location. Transformer T1 isolates the telephone line from the rest of the circuitry so as to preserve line balance as required by operating telephone companies. Transformer T1 also presents a 600 ohm termination to be leased telephone line, a 75 ohm termination for voice and signal circuits and a 600 ohm termination for the oscillator on integrated circuit board 4 when activated. The 1 KHz tone received from the local location at the remote location, as illustrated in FIG. 1, passes through transformer T1 and then normally closed contacts of relays $RL_2$ and RL1 and is delivered to the input of high pass filter 6 located on integrated circuit board 1. The cutoff frequency of high pass filter 6 is, for the example employed herein utilizing a 1 KHz tone, 900 Hz (hertz). The purpose of filter 6 is to attenuate high amplitude 333.33 Hz and 500 Hz signals so that when amplifier A1 is saturated, the 1 KHz overtones of these clipped signals will be below the level set for maximum system sensitivity. Amplifier A1 is a three stage amplifier with a gain of 250 whose function is to boost low level signals encountered when telephone lines of high loss are employed.

The output of amplifier A1 feeds a combination narrow band filter and amplitude limiter 7 on integrated circuit board 2. In this particular example employed, the filter is a high Q LC tank circuit with a parallel varistor. The center frequency of filter 7 is 1 KHz. The filter-limiter 7 combination gives a bandwidth of ±30 Hz at 25m VRMS (millivolt root mean square) input, and ±120 Hz at 300m VRMS to 5.0 VRMS input. The limiter action of the filter limiter combination 7 is responsible for the virtually straight sided bandwidth input level characteristic above 300 m VRMS. The output of filter-limiter 7 feeds into the amplifier A2 which is a combination voltage and buffer amplifier. The output of amplifier A2 is then rectified and filtered in rectifier and filter 8 of circuit board 2 to provide a DC (direct current) voltage level corresponding to the 1 KHz input signal amplitude up until the limiter action of filter-limiter 7 is encountered.

The DC voltage output of the rectifier-filter 8 feeds the input of a Schmitt trigger 9 on integrated circuit board 3. The threshold or activation level of the Schmitt trigger 9 has been optimized along with rectifier-filter output and preceding gain to produce an overall system sensitivity of 25m VRMS at 1 KHz, and a dynamic input range of 46 db (decibels) over a temperature range of 0° C (centigrade) to 55° C. The two opposite polarity outputs of Schmitt trigger 9 are utilized. The negative going output 10 is used to trigger a monostable timer circuit and also to enable one input of an AND circuit 12. The positive going output 13 of Schmitt trigger 9 is diode blocked when Schmitt trigger 9 is activated, but when the trigger 9 returns to its quiescent state, this output becomes negative going and is used to instantly return monostable circuit 11 to its quiescent state regardless of how far its active timing phase has progressed. In its quiescent state monostable circuit 11 enables the second input of AND circuit 12 and disables this input during its active timing phase. Conversely, Schmitt trigger 9 disables the first input to AND circuit 12 when quiescent and enables this input when activated. Since activation of the Schmitt trigger 9 also triggers monostable circuit 11 into its active timing phase, the inputs of AND circuit 12 has the polarity reversed, that is, one input is a binary "1" and the other input is a binary "0." Therefore, since one of the inputs is always a binary "1" while the other input is a binary "0," AND circuit 12 does not produce an output. Since the monostable circuit 12 has been designed for an active timing phase of 0.8 seconds, in the example employed herein, input signals of lesser duration will not cause AND circuit 12 to produce an output. In addition, since monostable circuit 11 can be instantly returned to its quiescent condition by the deactivated Schmitt trigger 9, closely spaced bursts of 1 KHz energy that individually having a time duration of less than 0.8 seconds will not produce an output from AND circuit 12. Only when the 1 KHz signal exceeds 0.8 seconds duration will AND circuit 12 produce an output, since now monostable circuit 11 has "timed out" and is in its quiescent state, while Schmitt trigger 9 is still active. This condition enables both inputs of AND circuit 12. The output of AND circuit 12 drives buffer amplifier A3 which in turn activates relay RL5. Relay RL5 will remain activated for the amount of time the 1 KHz tone or signal exceeds 0.8 seconds. As employed in the present example, a legitimate signal intended to operate the arrangement of this invention is a 1 KHz tone burst of 1.2 seconds duration. Thus, relay RL5 will be operated for 0.4 seconds. The timing phase of monostable circuit 11 was optimized at 0.8 seconds. This value gives reliable immunity against false operation by normal human speech, while not demanding excessively long duration control signals.

During the period of activation, relay RL5's armature and normally open contacts charges a capacitor bank having a value, in the example employed herein, of 750 microfarads. The capacitor bank includes capacitors C27, C28 and C29 and is charged through resistor R78 from a +28 volt DC source. When relay RL5 is deactivated, which occurs at the end of a control signal, the capacitor bank discharges its energy into the field coil of relay RL4 via the armature and normally closed contact of relay RL5. There is sufficient energy released from the capacitor bank to keep relay RL4 activated for a period ranging from five to seven seconds in duration. While activated, one of relay RL4's contacts connects the input of page amplifier A7 in parallel with the signal path coming from the 75 ohm tap on transformer T1. The 1.2 second control signal is normally followed by a paging message which is then amplified by amplifier A7 which feeds an audio power amplifier 14 connected to a loudspeaker system 15. At the end of the 5 to 7 second interval, when relay RL4 is deactivated, the input to amplifier A7 is disconnected from the audio source, effectively terminating the paging message. Five to 7 seconds was found to be sufficient to fully complete a paging message with little excess time left before deactivation of the paging amplifiers A7 and 14. The second contact 16 of relay RL4 provides a convenient ground connection during the five to seven second paging interval for operation of auxiliary equipments through interconnect terminal 17.

Upon hearing the paging message over the loudspeaker system, the "called" party goes offhook to answer. This places a telephone type handset between system ground and the telephone terminal 18 which causes relay RL1 to activate. Relay RL1 acts as a telephone retard coil for the development of voice signals originating from the handset, while one of its contacts connects a +150 volts DC to the light terminal 19 as a means of busy indication via operation of neon lamps in other subsets. The other contact of activated relay RL1 removes the 75 ohm transformer winding from the receiver input, the input to circuit board 1, and connects it to the handset circuit via DC blocking capacitor C26, thus enabling the "called" party to communicate with the "calling" party via the leased telephone line matched to 75 ohm telephone type handsets. When communication is terminated, the handset goes onhook which deactivates relay RL1 which effectively restores the receiver input to the leased telephone line via transformer T1.

As pointed out hereinabove, the "calling" party has an identical arrangement on his side of the leased telephone line or channel and begins the call by taking his handset offhook. This action, as described previously, activates relay RL1 which in turn connects the handset to the matching transformer T1 while disengaging the receiver circuit contained on integrated circuit boards 1, 2 and 3. The paging message is initiated by grounding the key terminal 20 thereby activating relay RL3, which causes capacitor C24 to charge via the normally open contact of relay RL3 and a resistor in Schmitt trigger circuit 21. The charging current of capacitor C24 developes voltage across this resistor which activates Schmitt trigger 21. The output of the activated Schmitt trigger 21 drives a DC buffer amplifier A8 that gates on relay RL2. One contact of relay RL2 removes capacitor C24 from the relay RL3 contacts, and duplicates the connection, thereby becoming self-latching. As capacitor C24 charges, the charging current, and, therefore, the voltage activating Schmitt trigger 21 decreases until the deactivating threshold of Schmitt trigger 21 is reached. At this point Schmitt trigger 21 deactivates which causes relay RL2 to be gated off via buffer amplifier A8 and restores the entire circuit to its quiescent state. The thresholds of Schmitt trigger 21 in conjunction with capacitor C24 activates relay RL2 for a duration of 1.2 seconds. One contact of relay RL2 forms a self-latching circuit as described above. Of the remaining contacts, one disconnects the 75 ohm winding of T1 thereby preventing voice signals from being impressed upon the leased telephone line for the 1.2 second period. Another contact of relay RL2 connects the output of 1 KHz oscillator on integrated circuit board 4 to the 600 ohm tap on the equipment side of transformer T1. Thus, a 1 KHz signal of 0.42 VRMS amplitude is impressed across the leased telephone line for a duration of 1.2 seconds. The remaining contact connects a small portion of the 1 KHz signal to capacitor C26 and, hence, to the "calling" party's handset for the 1.2 second interval.

Immediately upon grounding the key terminal 20, a 1.2 second 1 KHz tone burst will be sent across the leased telephone line to the remote end. The "calling" party hears this tone burst, at a reduced level in the handset and upon cessation of the tones may commence the paging message. As briefly described, the end of the 1.2 second tone burst begins a 5 to 7 second interval in which the audio amplifiers A7 and 14 at the remote location are connected via transformer T1 to the leased telephone line.

Amplifiers A4 and A5 in conjunction with a narrow band filter and limiter 22 and a RC feedback network 23 located on circuit board 4 comprise the oscillator section of the 1 KHz tone source. The oscillator is basically a regenerative feedback circuit with the narrow band filter-limiter 22 producing maximum loop gain, and, hence, oscillations at its center frequency. The limiter of filter and limiter 22 controls the oscillation amplitude. Amplifier A6 is a buffer amplifier for matching the high impedance output of the oscillator on circuit board 4 to the lower impedance of the 600 ohm tap of transformer T1.

Also included in the system is a 700 Hz low level square wave oscillator 24 that is connected to the leased telephone line via contacts of relays RL1, RL2 and RL4 and transformer T1. The square wave signal at the output of oscillator 24 of 25 millivolts is present at all times during idle conditions and functions as an occupancy signal indicating to telephone company personnel that the leased line or channel in question is in use even though voice or control signals may be absent. The 700 Hz square wave signal may also function as a diagnostic tool. The presence of this signal in the handset indicates that there are no discontinuities in the leased telephone channel. Activating the 5 to 7 second paging period at the remote location by grounding the key terminal 20 at the local location will produce an absence of the 700 Hz signal for this interval. When the remote paging interval times out, the 700 Hz signal will be restored indicating proper operation of the remote device.

Figure 2:
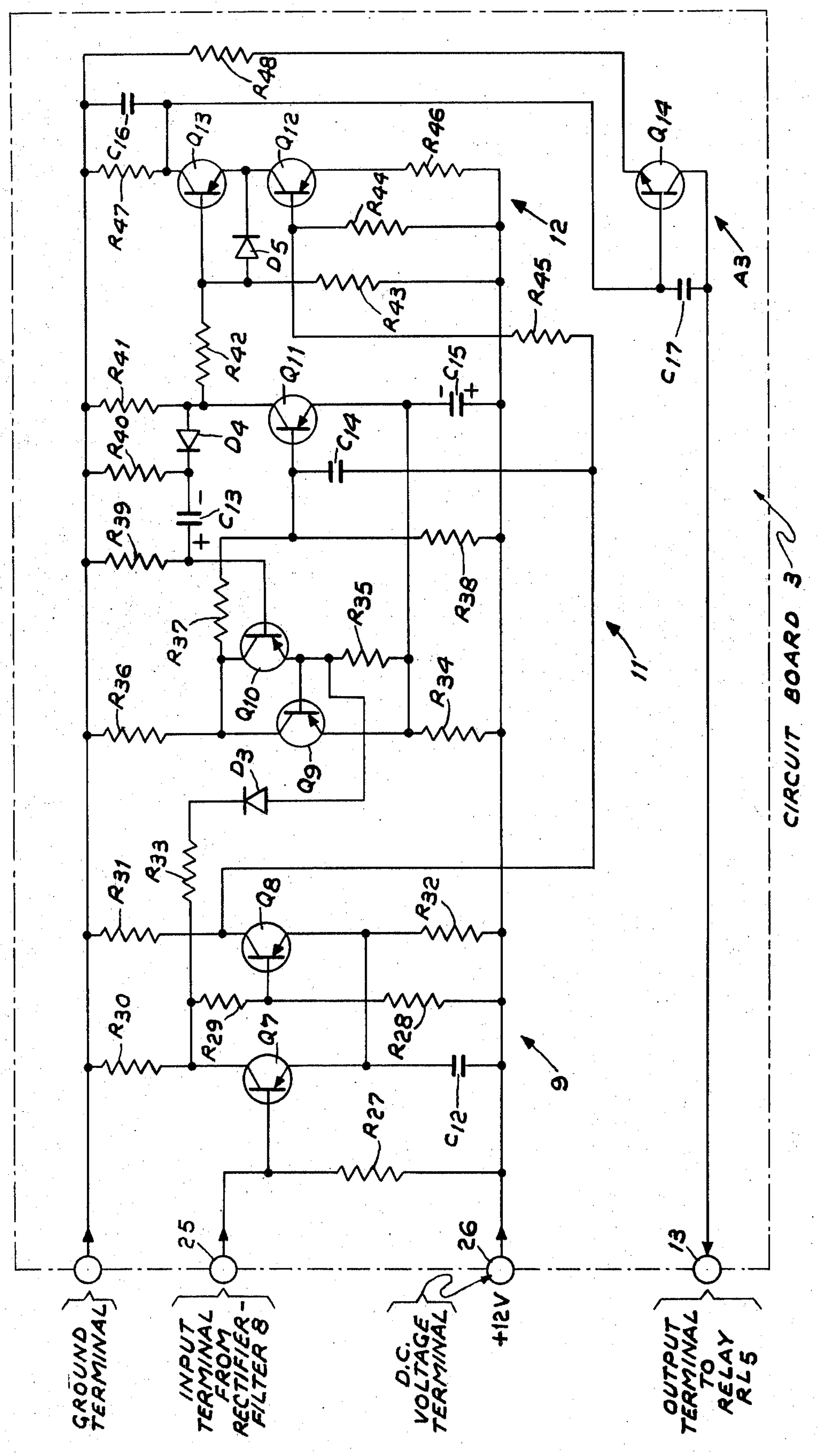
FIG. 2 is a schematic diagram of one embodiment of the circuitry present on integrated circuit board 3 of FIG. 1.

Referring to FIG. 2, there is disclosed therein a schematic diagram of the circuitry contained on integrated circuit board 3 of FIG. 1. The output stage of integrated circuit board 2 is rectifier-filter 8 which feeds DC levels corresponding to the receiver input signal amplitudes of the correct frequency into terminals 25 and 26 of circuit board member 3. The DC level required for input is negative with respect to the power source input of +12 volts DC, although ground reference could be used as well by employing positive DC input levels and NPN transistors.

The input resistance of circuit board 3 is furnished by the resistor R27. The value of this resistor was chosen to provide charge and discharge rates for the filter of rectifier-filter 8 that will produce optimum signal attack and decay times for the overall receiver circuit of circuit boards 1, 2 and 3.

The first circuit on circuit board 3 is Schmitt trigger or squaring circuit composed of PNP silicon transistors Q7 and Q8 and associated resistors and capacitors. Cut-off biasing for transistor Q7 is provided by resistor R27, while resistors R28 and R29 help maintain saturation bias for transistor Q8. Resistor R30 is the collector load for transistor Q7 and completes the bias circuit for transistor Q8. Resistor R32 is the emitter resistance common to both transistors Q7 and Q8 and provides part of regenerative feedback in the squaring circuit. Capacitor C12 in conjunction with resistor R32 provides an RC time constant that prevents "chattering" (rapid switching back and forth between quiescent and active states) when input levels are near the "activate" threshold. The remainder of the regenerative feedback is provided by a voltage divider including resistors R28 and R29. Resistor R31 is the collector load for transistor Q8. The activate, or switching threshold which is controlled by resistors R28, R29, R30 and R32 is set at −1.1 volt DC. When the squaring circuit is activated, the negative going output is derived from the collector of transistor Q8, and the positive going output is derived from the collector of transistor Q7.

The negative output of the squaring circuit provides a trigger for monostable timing circuit 11 composed of PNP silicon transistors Q9 and Q11 and a PNP germanium transistor Q10 along with associated resistors and capacitors. Transistor Q10 serves as a buffer between the timing capacitor C13 and the base of transistor Q9 and will withstand higher reverse base to emitter voltages because of its germanium construction.

Transistors Q9 and Q10 are biased on during quiescent states by a path provided by resistor R39. Transistor Q9 receives additional bias by a diode D3 and resistors R33 and R30. The monostable circuit is triggered on by a negative pulse applied to the base of transistor Q11. This is provided by the differentiating action of capacitor C14 and resistor R38 on the output produced by the collector of transistor Q8. Conversely, when the squaring circuit is deactivated the output on the collector of transistor Q8 goes positive which results in a positive pulse being applied at the base of transistor Q11, which aids in turning this transistor off. In addition, the secondary bias path of diode D3 and resistors R33 and R30 is reestablished which aids in turning transistor Q9 on. This path is disabled by reversed biased diode D3 when the collector of transistor Q7 is positive (squaring circuit activated). This combination of trigger and bias path enable the deactivating squaring circuit to interrupt the monostables timing sequence at any time and instantly return it to its quiescent state. Resistor R39 in conjunction with capacitor C13 provides a monostable timing duration of 0.8 seconds. Resistor R36 provides the collector loads for transistors Q9 and Q10. Resistor R34 and capacitor C15 provide an internal bias reference for the monostable circuit. Resistor R37 in conjunction with resistor R38 form a voltage divider which provides bias and DC coupling between the two sides of the monostable circuit. The collector load for transistor Q11 consists of resistors R40 and R41 and diode D4. This arrangement provides a sharp negative waveform edge at the collector of transistor Q11 when the monostable circuit times out, by reverse biasing diode D4 and allowing capacitor C13 to complete discharging via resistor R40.

The silicon PNP transistors Q12 and Q13 along with resistors R43, R44, R46, R47, diode D5 and capacitor C16 form a two input cascode AND circuit 12. Resistors R43 and R44 provide cut-off biasing during the absence of an input. Resistor R46 is the emitter resistor and resistor R47 is the collector load. Diode D5 protects the base-emitter junction of Q13 against reverse voltage breakdown, while the function of capacitor C16 is to suppress radio frequency oscillations. During quiescent conditions, the collector of transistor Q8 (squaring circuit) allows cut-off bias on the base of transistor Q12 via voltage divider including resistors R44 and R45, while the collector of transistor Q11 (the monostable circuit) biases on the base of transistor Q13 via a voltage divider including resistors R42 and R43. When the squaring circuit is activated, transistor Q12 is biased on by the collector of transistor Q8. The monostable circuit, having been triggered by transistor Q8, allows the cut-off bias of transistor Q13 to take effect. Thus, the two inputs of the AND circuit 12 have reversed binary states. Therefore, the situation remains where one input is enabled while the other is disabled, which means that the AND circuit 12 will not produce an output.

If the input to the squaring circuit is interrupted before 0.8 seconds have passed, the monostable is instantly disabled as described earlier. Again, under these circumstances AND circuit 12 will not produce an output. The main purpose of this "instant disable" function is to prevent an output from AND circuit 12 during the application of closely spaced inputs of less than 0.8 seconds duration each to circuit board 3, as is sometimes encountered during normal human speech.

When the input does exceed 0.8 seconds, transistor Q12 remains enabled (the squaring circuit is still active). However, the monostable has now "timed out" and restores forward bias to transistor Q13. Under this condition, both inputs of AND circuit 12 are enabled which results in an output.

The output signal from AND circuit 12 drives a buffer amplifier A3 which is composed of silicon NPN transistor Q14, resistor R48 and capacitor C17. Resistor R48 is an emitter resistor, while capacitor C17 functions as an RF suppressor. Transistor Q14 gates on a relay, namely, relay RL5 of FIG. 1, via its collector. Thus, the relay gated by transistor Q14 will not activate when inputs to circuit board 3 are less than 0.8 seconds, even if they occur in rapid succession. Only inputs exceeding 0.8 seconds will activate relay RL5. Relay RL5 will remain activated for the amount of time the input signal exceeds 0.8 seconds. Upon cessation of the input signal, the squaring circuit is deactivated which in turn allows cut-off bias to take effect on transistor Q12, thereby disabling one input of AND circuit 12 which in turn gates off relay RL5 via transistor Q14.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement to control a function at a remote location comprising:

a telephone line having an operating frequency band interconnecting a local location and said remote location;

a source of sinewave audio frequency control signal disposed at said local location, said audio control signal having a given frequency;

first means coupled to said telephone line at said local location to inject said audio control signal into said operating frequency band of said telephone line for a given length of time to provide said audio control signal having a first given time duration;

second means coupled to said telephone line at said remote location to detect said audio control signal; and third means coupled to said second means at said remote location responding to said audio control signal only if said audio control signal exceeds a second given time duration less than said first given time duration by a given amount to control said function at said remote location and to reject all other audio signals having said given frequency and a time duration less than said second time duration regardless of how close said audio signals having said time duration less than said second time duration are spaced.

2. An arrangement according to claim 1, wherein said first means includes a storage capacitor selectively connected into a charging circuit, a Schmitt trigger circuit selectively connected to said charging circuit, said Schmitt trigger circuit being activated by said charging circuit, and a relay actuated switching, circuit coupled to said Schmitt trigger circuit and said source, said switching circuit being under control of said Schmitt trigger circuit to couple said audio control signal to said telephone line for said first given time duration.

3. An arrangement according to claim 1, wherein said second means includes a high pass filter coupled to said telephone line, a narrow band filter and amplitude limiter coupled to said high pass filter, and a rectifier and filter coupled to said narrow band filter and amplitude limiter to produce a direct current voltage level corresponding to the amplitude of said audio control signal prior to being coupled to said narrow band filter and amplitude limiter.

4. An arrangement according to claim 1, wherein said third means includes a Schmitt trigger circuit coupled to said second means, said Schmitt trigger circuit having a negative polarity output and a positive polarity output, a monostable timer circuit having an active time equal to said second given time duration coupled to said negative polarity output to trigger said timer circuit and to said positive polarity output to return said monostable timer circuit to its quiescent state when said audio signals having said given frequency and a time duration less than said second given time duration, and an AND circuit coupled to said negative polarity output and the output of said monostable trigger circuit, said AND circuit only producing an output to control said function at said remote location when said monostable timer circuit has timed out after said active time and said Schmitt trigger circuit is active.

5. An arrangement according to claim 1, wherein said first means includes a storage capacitor selectively connected into a charging circuit, a Schmitt trigger circuit selectively connected to said charging circuit, said Schmitt trigger circuit being activated by said charging circuit, and a relay actuated switching circuit coupled to said Schmitt trigger circuit and said source, said switching circuit being under control of said Schmitt trigger circuit to couple said audio control signal to said telephone line for said first given time duration; and said second means includes a high pass filter coupled to said telephone line, a narrow band filter and amplitude limiter coupled to said high pass filter, and a rectifier and filter coupled to said narrow band filter and amplitude limiter to produce a direct current voltage level corresponding to the amplitude of said audio control signal prior to being coupled to said narrow band filter and amplitude limiter.

6. An arrangement according to claim 1, wherein said first means includes a storage capacitor selectively connected into a charging circuit, a first Schmitt trigger circuit selectively connected to said charging circuit, said first Schmitt trigger circuit being activated by said charging circuit, and a relay actuated switching circuit coupled to said first Schmitt trigger circuit and said source, said switching circuit being under control of said Schmitt trigger circuit to couple said audio control signal to said telephone line for said first given time duration; and said third means includes a second Schmitt trigger circuit coupled to said second means, said second Schmitt trigger circuit having a negative polarity output and a positive polarity output, a monostable timer circuit having an active time equal to said second given time duration coupled to said negative polarity output to trigger said timer circuit and to said positive polarity output to return said monostable timer circuit to its quiescent state when said audio signals having said given frequency and a time duration less than said second given time duration, and an AND circuit coupled to said negative polarity output and the output of said monostable trigger circuit, said AND circuit only producing an output to control said function at said remote location when said monostable timer circuit has timed out after said active time and said second Schmitt trigger circuit is active.

7. An arrangement according to claim 1, wherein said second means includes a high pass filter coupled to said telephone line, a narrow band filter and amplitude limiter coupled to said high pass filter, and a rectifier and filter coupled to said narrow band filter and amplitude limiter to produce a direct current voltage level corresponding to the amplitude of said audio control signal prior to being coupled to said narrow band filter and amplitude limiter; and said third means includes a Schmitt trigger circuit coupled to the output of said rectifier and filter, said Schmitt trigger circuit having a negative polarity output and a positive polarity output, a monostable timer circuit having an active time equal to said second given time duration coupled to said negative polarity output to trigger said timer circuit and to said positive polarity output to return said monostable timer circuit to its quiescent state when said audio signals having said given frequency and a time duration less than said second given time duration, and an AND circuit coupled to said negative polarity output and the output of said monostable trigger circuit, said AND circuit only producing an output to control said function at said remote location when said monostable timer circuit has timed out after said active time and said Schmitt trigger circuit is active.

8. An arrangement according to claim 1, wherein said first means includes a storage capacitor selectively connected into a charging circuit, a first Schmitt trigger circuit selectively connected to said charging circuit, said first Schmitt trigger circuit being activated by said charging circuit, and a relay actuated switching circuit coupled to said first Schmitt trigger circuit and said source, said switching circuit being under control of said Schmitt trigger circuit to couple said audio control signal to said telephone line for said first given time duration;

said second means includes a high pass filter coupled to said telephone line, a narrow band filter and amplitude limiter coupled to said high pass filter, and a rectifier and filter coupled to said narrow band filter and amplitude limiter to produce a direct current voltage level corresponding to the amplitude of said audio control signal prior to being coupled to said narrow band filter and amplitude limiter; and said third means includes a second Schmitt trigger circuit coupled to the output of said rectifier and filter, said second Schmitt trigger circuit having a negative polarity output and a positive polarity output, a monostable timer circuit having an active time equal to said second given time duration coupled to said negative polarity output to trigger said timer circuit and to said positive polarity output to return said monostable timer circuit to its quiescent state when said audio signals having said given frequency and a time duration less than said second given time duration, and an AND circuit coupled to said negative polarity output and the output of said monostable trigger circuit, said AND circuit only producing an output to control said function at said remote location when said monostable timer circuit has timed out after said active time and said second Schmitt trigger circuit is active.

* * * * *